(12) United States Patent
Rosell (10) Patent No.: US 10,928,891 B2
(45) Date of Patent: Feb. 23, 2021

(54) METHOD AND ARRANGEMENT FOR CALIBRATING A HEAD-MOUNTED DISPLAY

(71) Applicant: Tobii AB, Danderyd (SE)

(72) Inventor: Mikael Rosell, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/425,889

(22) Filed: May 29, 2019

(65) Prior Publication Data
US 2020/0257356 A1  Aug. 13, 2020

(51) Int. Cl.
*G06F 3/01* (2006.01)
*G06T 7/80* (2017.01)

(52) U.S. Cl.
CPC ............... *G06F 3/012* (2013.01); *G06T 7/80* (2017.01)

(58) Field of Classification Search
None
See application file for complete search history.

(56) References Cited

U.S. PATENT DOCUMENTS

| | | | |
|---|---|---|---|
| 9,589,348 B1 | 3/2017 | Linde et al. | |
| 10,198,865 B2 * | 2/2019 | Kezele | G06T 19/006 |
| 10,685,431 B1 * | 6/2020 | Geng | G06T 7/80 |
| 2012/0062445 A1 * | 3/2012 | Haddick | H04N 5/23293 345/8 |
| 2013/0187943 A1 | 7/2013 | Bohn et al. | |
| 2015/0193018 A1 * | 7/2015 | Venable | G02B 27/017 345/158 |
| 2017/0161955 A1 | 6/2017 | Li et al. | |
| 2018/0348861 A1 * | 12/2018 | Uscinski | A63F 13/213 |

OTHER PUBLICATIONS

Swedish Patent and Registration Office, Office Action and Search report dated Jan. 29, 2019.

* cited by examiner

*Primary Examiner* — Duane N Taylor, Jr.
(74) *Attorney, Agent, or Firm* — Samuel I. Yamron (57) ABSTRACT

The present disclosure relates to a method for calibrating a camera of a head-mounted display, HMD. The method comprises providing a calibration target in front of a lens of the HMD. Each of the calibration target and the lens basically extend in a corresponding two-dimensional plane. The method further comprises determining a lateral position of the calibration target. The lateral position relates to a position of the calibration target in the two-dimensional plane. The method even further comprises determining a lateral position of the lens. The lateral position relates to a position of the lens in the two-dimensional plane. The method yet even further comprises determining a calibration target misalignment based on the determined lateral position of the calibration target and based on the determined lateral position of the lens. The method also comprises performing a hardware calibration of the HMD. The hardware calibration is adapted for the calibration target misalignment.
The present disclosure also relates to an arrangement and a computer program product.

20 Claims, 5 Drawing Sheets

METHOD AND ARRANGEMENT FOR CALIBRATING A HEAD-MOUNTED DISPLAY

CROSS-REFERENCE TO RELATED APPLICATION

The present application claims benefit to Swedish patent application No. 1850650-1, filed on May 18, 2018, to Mikael ROSELL, entitled "METHOD AND ARRANGEMENT FOR CALIBRATING A HEAD-MOUNTED DISPLAY", and is hereby incorporated by reference in its entirety.

TECHNICAL FIELD

The present disclosure relates to a method and an arrangement for calibrating a head-mounted display, HMD. The present disclosure further relates to a computer program product.

BACKGROUND ART

Head-mounted displays, HMD, need to be calibrated. This is due to the fact that production tolerances will cause a manufacturing process not to produce perfectly aligned components in one hundred percent of the cases. A calibration can then take care of the production tolerances and can assure to provide good performance and good user experience of the HMD. However, calibration processes tend to be time and resource consuming. Thus, they might increase production cost.

Further, it might be difficult to fixate calibration targets in relation to HMDs. Thus is due to the design of many HMDs, especially HMDs with round plastics and high tolerance joints.

SUMMARY OF THE INVENTION

It is an objective of the present disclosure to provide a method, an arrangement, and a computer program product which alleviates at least some of the above-described properties. It is a further objective of the present disclosure to provide an alternative method, an alternative arrangement, and an alternative computer program product for calibrating a head-mounted display, HMD.

According to one aspect, at least some of the objectives are achieved by a method for calibrating a camera of a head-mounted display, HMD. The method comprises providing a calibration target in front of a lens of the HMD. The calibration target basically extends in a corresponding two-dimensional plane. The lens basically extends in a corresponding two-dimensional plane. The method further comprises determining a lateral position of the calibration target. The lateral position relates to a position of the calibration target in the two-dimensional plane. The method even further comprises determining a lateral position of the lens. The lateral position relates to a position of the lens in the two-dimensional plane. The method yet even further comprises determining a calibration target misalignment based on the determined lateral position of the calibration target and based on the determined lateral position of the lens. The method also comprises performing a hardware calibration of the camera of the HMD. The hardware calibration is adapted for the calibration target misalignment.

This allows for a good calibration of a camera of the HMD. By determining the lateral position of the calibration target and of the lens, the specific values of these two properties can be taken care of during hardware calibration. Thus, production tolerances can be better addressed. Further, this allows a better hardware calibration, for example regarding intrinsic and extrinsic parameters of the camera.

In one example, the step of determining the lateral position of the calibration target comprises determining the lateral position of a central point of the calibration target. This allows for easy adaption algorithms.

In one example, the step of determining the lateral position of the calibration target comprises illuminating the calibration target with first light from a first light source from a side of the calibration target which is opposite the side of the lens so that the first light from the first light source is transmitted through the calibration target to the lens. This allows for an easy determination of the lateral position of the calibration target.

In one example, the step of determining the lateral position of the calibration target further comprises detecting the first light with the camera arranged on a side of the lens which is opposite the calibration target. This allows using the camera in the HMD for determining the lateral position, thus reducing the need of additional equipment for calibration.

In one example, the step of determining the lateral position of the lens comprises determining the lateral position of a lens centre. This allows for easy adaption algorithms.

In one example, the step of determining the lateral position of the lens comprises determining the lateral position of the lens at several calibration distances between the lens and the calibration target. The calibration distance is the distance between the lens and the calibration target perpendicular to the lateral extensions of the lens and the calibration target. The lateral position of the lens is determined based on the determined lateral positions of the lens at several calibration distances between the lens and the calibration target. This allows for a more stable calibration algorithm.

In one example, the step of determining the lateral position of the lens comprises illuminating the calibration target with second light from a second light source, wherein the second light source is preferably arranged between the lens and the calibration target. This allows for an easy determination of the lateral position of the lens. Further, a light source in the HMD can be used for determining the lateral position, thus reducing the need of additional equipment for calibration.

In one example, the step of determining the lateral position of the lens further comprises detecting reflections of the second light with the camera arranged on a side of the lens which is opposite the calibration target. This allows using the camera in the HMD for determining the lateral position, thus reducing the need of additional equipment for calibration.

In one example, step of determining the lateral position of the lens further comprises determining blobs in the reflections of the second light. This allows for an easy determination of the lateral position of the lens, especially in case a Fresnel lens is used in the HMD. The blobs are in one example caused by the stray light transmitted from the reflections from the calibration target through the lens.

In one example, the step of determining the lateral position of the lens further comprises determining a lens centre based on intersection(s) between longitudinal extension lines of the determined blobs. This allows for an easy determination of the lateral position of the lens, especially in case a Fresnel lens is used in the HMD.

In one example, the step of providing a calibration target in front of a lens of the HMD comprises mounting the calibration target in a calibration mount and fixating the calibration mount in relation to the HMD. This allows for a yet more accurate hardware calibration.

According to one aspect, at least some of the objectives are achieved by an arrangement for calibrating a camera of a head-mounted display, HMD. The arrangement comprises the HMD. The HMD comprises at least one lens. The lens basically extends in a two-dimensional plane.

The arrangement comprises a calibration target. The calibration target is arranged in front of the lens. The calibration target basically extends in a two-dimensional plane. The arrangement further comprises a calibration processor. The calibration processor is arranged to determine the lateral position of the calibration target. The lateral position of the calibration target relates to a position of the calibration target in the two-dimensional plane. The calibration processor is further arranged to determine the lateral position of the lens. The lateral position of the lens relates to a position of the lens in the two-dimensional plane. The calibration processer is even further arranged to determine the calibration target misalignment based on the determined lateral position of the calibration target and based on the determined lateral position of the lens. The calibration processor is yet even further arranged to performing a hardware calibration of the camera of the HMD, wherein the hardware calibration is adapted for the calibration target misalignment.

In one embodiment, the arrangement further comprises a calibration mount. The calibration mount comprises the calibration target. The calibration mount can be fixed or movable in relation to the HMD.

In one embodiment, the HMD is a virtual reality, VR, HMD.

In one embodiment, the arrangement further comprises a first light source. The first light source is arranged to illuminate the calibration target with first light from a side of the calibration target which is opposite the side of the lens so that the first light from the first light source is transmitted through the calibration target to the lens.

In one embodiment, the arrangement further comprises a second light source. The second light source is arranged to illuminate the calibration target with second light, wherein the second light source is preferably arranged between the lens and the calibration target.

In one embodiment, the first light source or the second light source comprises at least one light emitting diode.

In one embodiment, the camera is arranged on the side of the lens which is opposite the calibration target.

In one embodiment, the lens is a Fresnel lens.

According to one aspect, at least some of the objectives are achieved by a computer program product comprising instructions which, when executed by a computer, cause the computer to carry out the step of determining the lateral position of a calibration target in front of a lens of the HMD. The calibration target and the lens each basically extend in a two-dimensional plane. The lateral position of the calibration target relates to a position of the calibration target in the two-dimensional plane. The computer program product further comprises instructions which, when executed by a computer, cause the computer to carry out the steps of determining the lateral position of the lens, and determining the calibration target misalignment based on the determined lateral position of the calibration target and based on the determined lateral position of the lens. The lateral position of the lens relates to a position of the lens in the two-dimensional plane. The computer program product even further comprises instructions which, when executed by a computer, cause the computer to carry out the step of performing a hardware calibration of the HMD. The hardware calibration is adapted for the calibration target misalignment.

The arrangement and the computer program product provides corresponding advantages as described in relation to the method. Further, it should be emphasised that properties disclosed in relation to the method easily can be applied to the arrangement, and vice versa. The same applies to the computer program product.

BRIEF DESCRIPTION OF THE DRAWINGS

For a more detailed understanding of the present invention and its objects and advantages, reference is made to the following detailed description which should be read together with the accompanying drawings. Same reference numbers refer to same components in the different figures. In the following.

DETAILED DESCRIPTION

Figure 1A:
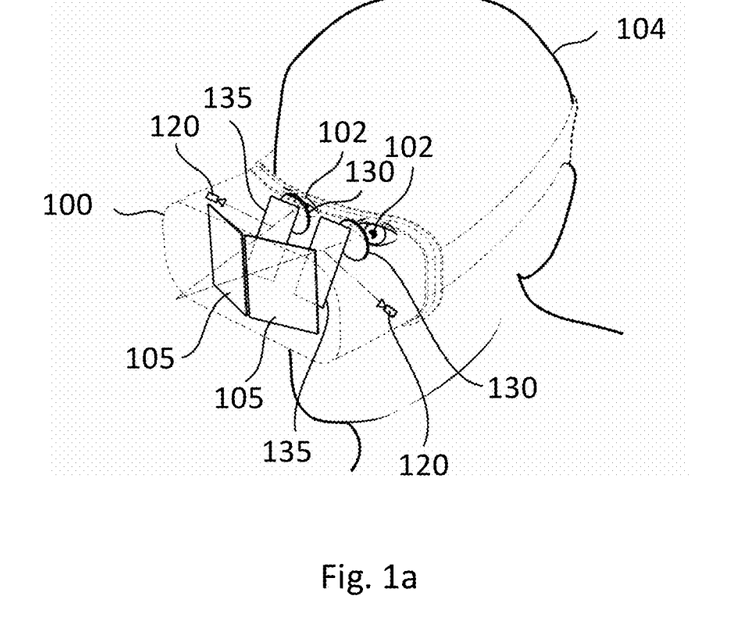
FIG. 1a depicts a schematic view of parts of a HMD in use.
Figure 1B:
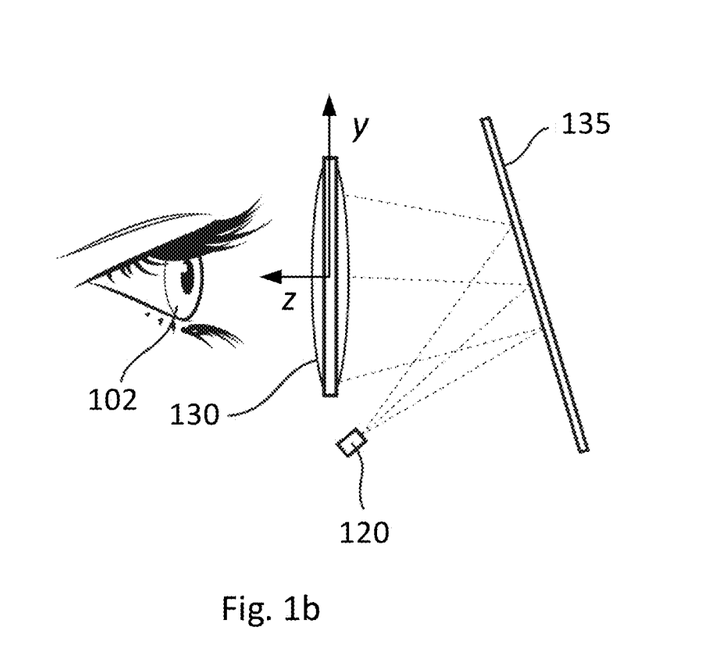
FIG. 1b depicts an aspect of parts of a HMD when in use.

FIG. 1a and FIG. 1b depict a schematic view of selected parts of an embodiment of a HMD when in use. The depicted HMD can be a virtual reality, VR, HMD 100. The VR HMD 100 can comprise an eye tracking system. It should be understood that the present disclosure is equally applicable for HMD without VR functionality.

Referring first to FIG. 1a, in addition to the VR HMD 100, eyes 102 and a head 104 of a user are shown. The VR portion of the VR HMD 100 shown comprises two VR displays 105 and two VR lenses 130, one VR display 105 and one VR lens 130 for each eye 102. The VR displays 105 are positioned in front of the eyes 102 and the VR lenses 130 are positioned between the eyes 102 and the VR displays 105. As an alternative to two VR displays 105, two regions of a single VR display may be used. The eye tracking portion of the VR HMD 100 comprises two so-called hot mirrors 135 and two cameras 120. In order to capture images of the eyes 102 for use in eye tracking, the hot mirrors 135 are arranged between the VR displays 105 and the VR lenses 130. Furthermore, illuminators (not shown) are arranged on or in the VR HMD 100 such that illumination rays are directed towards the eyes 102. Reflections from the eyes 102 of the illumination rays towards the hot mirrors 135 will reflect towards the cameras 120 in which the illumination rays are detected to produce an image of the eye. For example, the hot mirrors 135 may be of a type such that they will reflect light in the infrared frequency band but be transparent for light in the visible frequency band. The illuminators (not show) used would then produce illumination rays in the infrared frequency band and the cameras 120 will include image sensors able to detect light in the infrared frequency band.

FIG. 1b shows a side view of selected parts of the VR HMD 100. Illumination rays from the illuminators (not shown) towards the eye 102 will reflect back and pass through the VR lens 130 towards the hot mirror 135 and reflect towards the camera 120 in which the illumination rays are detected to produce an image of the eye.

The previous figures depict a possibility of an intended use of a HMD. It should, however, be understood that aspects of the present disclosure can be applied in connection to manufacturing of a HMD, i.e. prior the intended use of the HMD. On the other hand, it should also be emphasised that the present disclosure is not limited to the manufacturing process and can be equally applied at any time of the life cycle of the HMD.

Figure 1C:
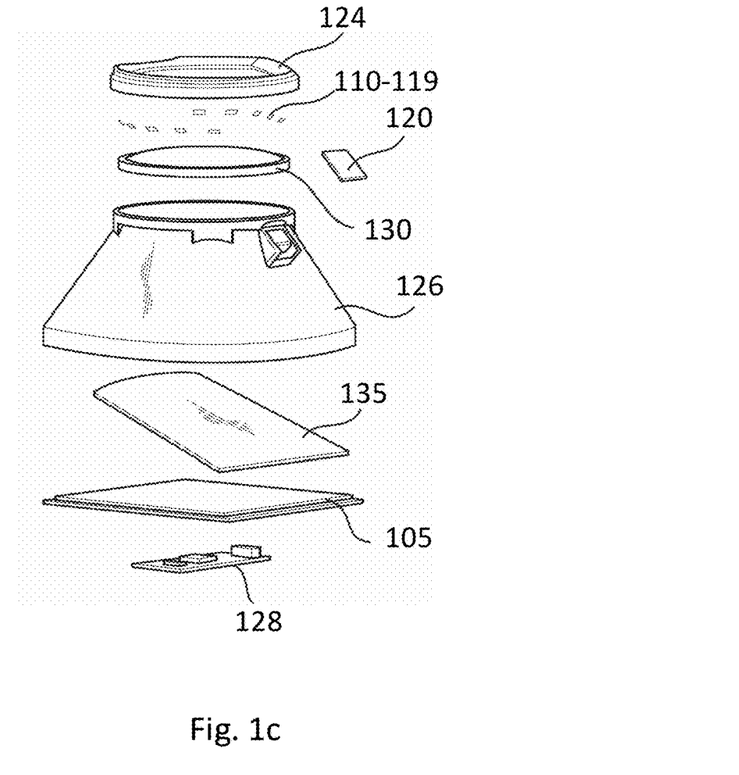
FIG. 1c depicts an embodiment of a part of a HMD.

FIG. 1c shows an exploded view of selected parts of the VR HMD 100. Selected parts for one eye are shown including an illuminator cover 124, illuminators in the form of light emitting diodes, LEDs, 110-119, the camera 120 including an image sensor, the VR lens 130, a lens cup or lens tube 126, the hot mirror 135, the VR display 105 and an electronics board 328. FIG. 1c shows an example arrangement of the illuminators in the form of LEDs 110-119, where the LEDs 110-119 are arranged along the periphery of the VR lens 130 to produce a pattern when illuminating the eye 102. The illumination rays from the LEDs 110-119 reflected from the eye and the hot mirror 135 is detected in the camera 120 to produce an image of the eye. The above is only an example of selected parts of a VR HMD for a better understanding of how a specific embodiment may be implemented in practice. The present disclosure, however, is in no way limited to this example, but can in principle be used with any kind of HMD.

Figure 2A:
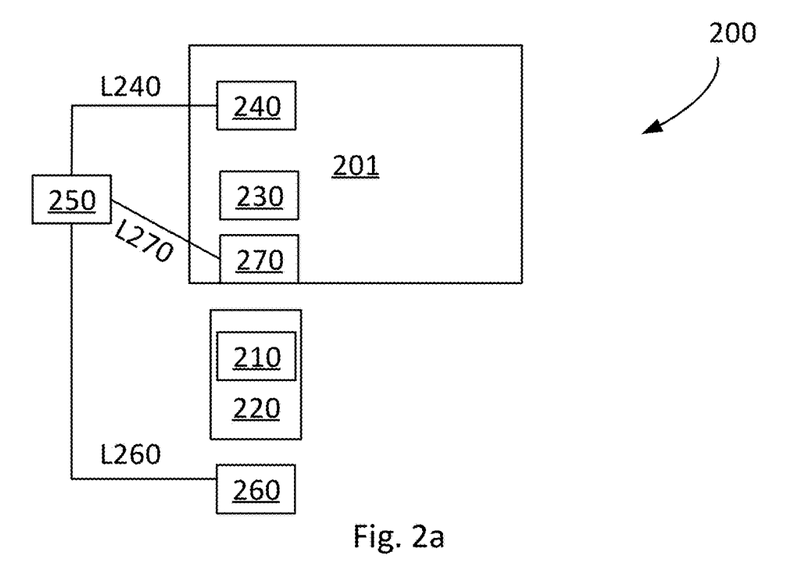
FIG. 2a depicts a schematic view of an arrangement according to the present disclosure.

FIG. 2a depicts a schematic view of an arrangement 200 according to the present disclosure. The arrangement 200 is an arrangement for calibrating a head-mounted display, HMD, 201. The HMD 201 can be a VR HMD 100 as described in relation to FIG. 1a-c.

The arrangement 200 comprises the HMD 201. The HMD 201 comprises at least one lens 230. The at least one lens 230 can be the VR lens 130. In one example, the HMD 201 comprises at least two lenses 230, at least one lens 230 for each eye. In one example, the at least one lens 230 is a Fresnel lens. The at least one lens 230 basically extends in a two-dimensional plane.

Figure 2B:
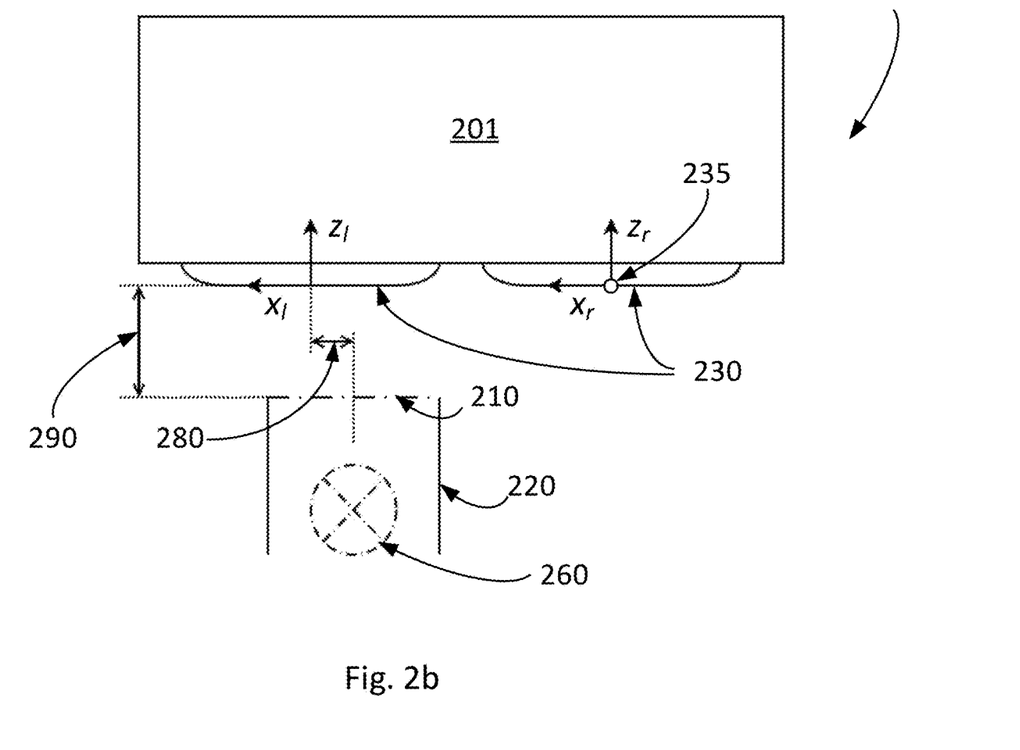
FIG. 2b depicts a schematic view of an arrangement according to the present disclosure.
Figure 4A:
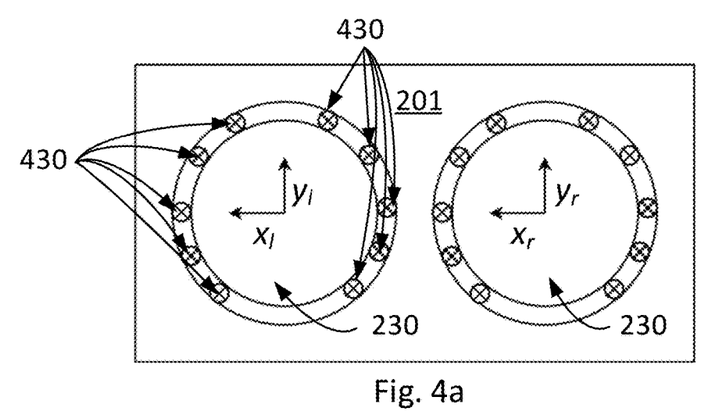
FIG. 4a-b depicts a schematic example of two lenses in a HMD.
Figure 4B:
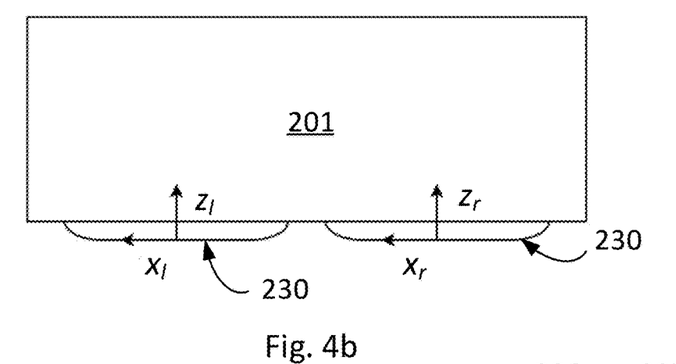

Examples of how the lens might extend in the two-dimensional plane is, for example, given in FIG. 2b and in FIG. 4. In the following, the two-dimensional plane in which the lens 230 basically extends will be spanned by two orthogonal vectors x and y. In case two lenses 230 are used, one for the left eye and one for the right eye, the basically two-dimensional plane in which the two lenses 230 extend can be spanned by corresponding vectors $x_r$, $y_r$, or $x_l$, $y_l$, respectively, where the subscripts r and/refer to the right and left lens, respectively. The vector perpendicular to the two vectors x and y will be denoted z. In case a left and a right lens are used, the vector perpendicular to the corresponding right and left vectors x and y will be denoted $z_r$ and $z_l$, respectively.

The lateral position of the lens 230 relates to a position of the lens in the two-dimensional plane in which it basically extends, i.e. in the plan spanned by the vectors x and y. The lens 230 comprises a lens centre 235. The lens centre 235 can be the geometrical centre of the lens. However, any other definition of the lens centre 235 is possible as well, as long as the lens centre refers to a specific pre-determined point of the lens. It should be understood that the lens centre 235 generally does not coincide with the intersection of the vectors x, y, and z. This might occasionally be the case. However, in general the lens centre 235 will not be perfectly aligned with a pre-determined coordinate system when the lens 230 is mounted in the HMD 201.

The arrangement 200 further comprises a calibration target 210. The calibration target 210 is arranged in front of the lens. In a preferred example, the term in "front of the lens" indicates that the calibration target is arranged at a different position in the z direction as compared to the lens. The calibration target 210 basically extends in a two-dimensional plane. In one example, the calibration target 210 extends in basically the same two-dimensional plane as the at least one lens 230. In case the arrangement 200 comprises more than one lens 230, there might be provided more than one calibration target 210. In one example, two calibration targets 210 are provided, one for a right lens 230 and one for a left lens 230. Alternatively, only one calibration target 210 is provided for more than one lens 230. In this case, the calibration of the more than one lens 230 might be performed subsequently.

Preferably, the two-dimensional plane in which the at least one lens 230 extends and the two-dimensional plane in which the calibration target 210 extends are basically parallel, i.e. they preferably basically coincide at z=0.

The calibration target 210 has a lateral position. The lateral position of the calibration target 210 relates to a position of the calibration target in the two-dimensional plane in which it basically extends, i.e. in the x and y direction.

The lateral position of the lens 230 and of the calibration target 210 are typically two-dimensional, i.e. typically have a component in the x and a component in the y direction.

The arrangement 200 can comprise a calibration mount 220. The calibration mount 220 can comprises the calibration target 210. In one example, the calibration mount 220 is movable in relation to the HMD 201. In one example, the calibration target 210 is arranged movable at the calibration mount 220 basically along the z direction. In one example, the calibration target 210 is arranged basically fixed at the calibration mount 220 in the x and y direction. This allows the calibration target 210 to be moved to different calibration distances in relation to the lens 230. The calibration distance is the distance between the lens and the calibration target perpendicular to the lateral extensions of the lens and the calibration target, i.e. in the z direction.

The arrangement 200 further comprise a calibration processor 250. The calibration processor 250 can comprise electronic circuits. The calibration processor 250 is arranged determine the lateral position of the calibration target 210. The calibration processor 250 is further arranged to determine the lateral position of the lens 230. The calibration processor 250 is also arranged to determine the calibration target misalignment based on the determined lateral position of the calibration target 210 and based on the determined lateral position of the lens 230. The calibration processor is also arranged to perform a hardware calibration of the HMD 201, wherein the hardware calibration is adapted for the calibration target misalignment. This is described further in relation to FIG. 6.

The arrangement 200 can comprise a first light source 260. The first light source 260 is arranged to illuminate the calibration target 210 with first light from a side of the calibration target 210 which is opposite the side of the lens 230. This illumination is arranged to be in such a way that the first light from the first light source 260 is transmitted through the calibration target 210 to the lens 230. In one example, this is achieved by arranging the first light source 260 at a side of the calibration target 210 which is opposite the side of the lens 230, as illustrated in FIG. 2b. However, this is not a prerequisite. The first light source 260 can in principle be placed anywhere. As an example, the first light might be directed with mirrors, optical fibres, or the like, so that the calibration target 210 is illuminated with the first light from a side of the calibration target 210 which is opposite the side of the lens 230. The first light source 260 can comprise one or more light emitting diodes, LED.

The arrangement 200 can comprise a second light source 270. The second light source 270 is arranged to illuminate the calibration target 210 with second light from a side of the lens 230, wherein the second light source is preferably arranged between the lens and the calibration target. In one example, this is achieved by arranging the second light source 270 at a side of the lens 230 which is opposite the side of the calibration target 210. However, this is not a prerequisite. The second light source 270 can in principle be placed anywhere. As an example, the second light might be directed with mirrors, optical fibres, or the like, so that the calibration target 210 is illuminated with the second light from a side of the lens 230 which is opposite the side of the calibration target 210. The second light source 270 can comprise one or more LED.

In one embodiment, the second light source 270 is the LEDs 110-119 described in relation to FIG. 1c. By this, components of the HMD 201 can be used for calibration, thus minimising the need for potential additional elements during calibration.

In one example, the arrangement 200 comprises a camera 240. The camera 240 is preferably arranged on the side of the lens 230 which is opposite the calibration target 210. The camera 240 can be arranged to detect the first light transmitted through the calibration target 210. The camera 240 can be arranged to detect second light reflected from the calibration target 210. In one example, the camera 240 can be the camera 120 described in relation to FIG. 1a-c. The camera 240 can be a part of the HMD 201. This reduces the need for additional components required to calibrate the HMD 201.

In one example, the calibration processor 250 is arranged to switch on and/or off the first and/or second light source 260, 270. As an example, the calibration processor 250 can be arranged to control the first and the second light source 260, 270 in such a way that at most only first or only second light is emitted during calibration. By this, it is assured that the camera will receive either only light from transmission through the calibration target 210 or only light of reflection from the calibration target 210. However, this is not a prerequisite. In principle, other solutions are possible. In one example, one or more controllable filter (not shown) are arranged between the calibration target 210 and the camera 240. In case the first and the second light differ in their properties, for example in polarisation or in the wavelength used, the filter(s) can be adapted to and be controlled to basically let pass through only the first or only the second light. The calibration processor 250 can be arranged to control the camera 240. The calibration processor 250 can be arranged to perform the control of the camera 240 and of the first and second light source 260, 20 via corresponding communication channels L240, L260, L270. The communication channels L240, L260, L270 can be wired or non-wired. The communication channels L240, L260, L270 can be combined to a common communication channel, such as a common bus. The calibration processor 250 can be arranged to receive information from the camera 240, such as images taken by the camera when the first or the second light was present.

Figure 5A:
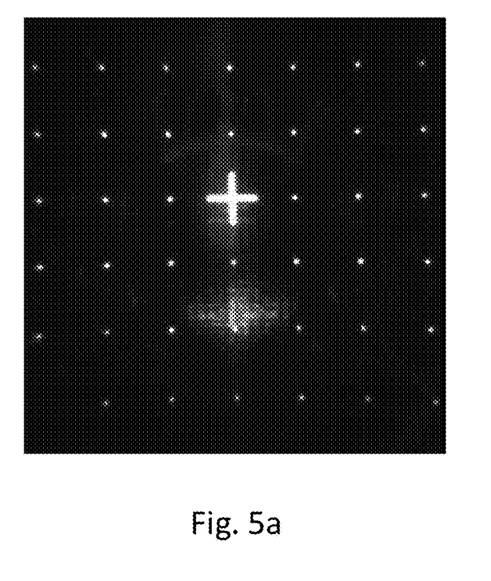
FIG. 5a depicts an example of a transmission calibration image.
Figure 5B:
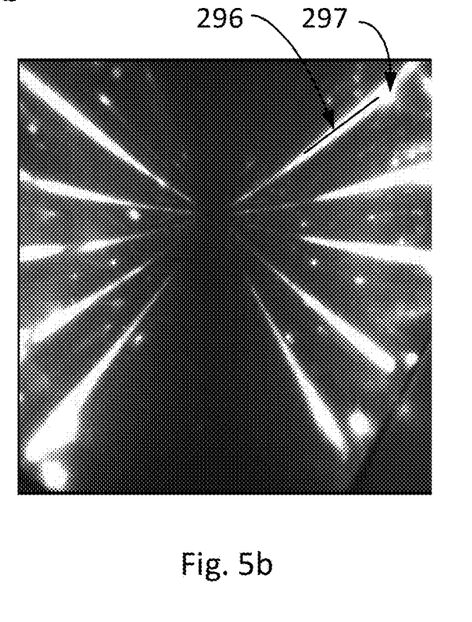
FIG. 5b depicts an example of a reflection calibration image.

Examples of images taken by the camera when only first light or only second light has been detected, respectively, can be seen in FIGS. 5a and 5b. This will be described in more detail in relation to FIGS. 5a and 5b.

FIG. 2b depicts a schematic view of an arrangement 200 according to the present disclosure. The elements correspond to the elements already described in relation to FIG. 2a. In FIG. 2b, the HMD 201 comprises two lenses 230. Further, the calibration distance 290 and the calibration target misalignment 280 are indicated. It should be emphasised that in the example of FIG. 2b the lateral position of the left lens 230 is zero in x direction. However, this is in general not necessarily the case. Further, it should be emphasised that the example depicted in FIG. 2b is only a two-dimensional sketch. Thus, in general there is a misalignment in the y direction as well. In one example the calibration distance 290 might be changed so that, for example, images can be made of the calibration target at several calibration distances.

Figure 3:
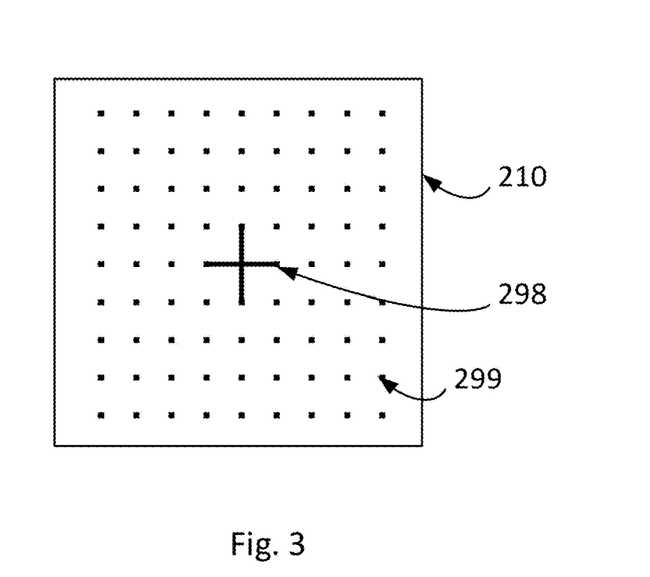
FIG. 3 depicts a schematic example of a calibration target.

FIG. 3 depicts a schematic example of a calibration target 210. The shown example is a side view of the calibration target 210. When implemented in the arrangement 200 of FIG. 2b the depicted example would be in the x and the y direction. The calibration target 210 can contain several rows with a number of small openings 299 in each row. For not overloading the figure, only one small opening is depicted with a reference sign. In the shown example, the calibration target 210 comprises nine rows with nine small openings 299. The small openings 299 are depicted by black dots. The small openings 299 are preferably arranged to let light pass through them. In the shown example, a cross 298 is arranged in the middle of the calibration target 210. The cross 298 can extend into some of the small openings 299. The cross 298 is preferably arranged to let light pass through it. The light to pass through the cross 298 and the small openings 299 is preferably at least the first light. The rest of the calibration target 210 is preferably arranged to be non-transparent for light, preferably especially for the first light.

Many different examples of calibration targets are possible. In one example, the calibration target 210 comprises at least one element which allows to determine a reference point at the calibration target. In the shown example, the cross 298 in the middle allows to determine a reference point at the calibration target 210.

FIG. 4a-b depicts a schematic example of two lenses 230 in the HMD 201. FIG. 4a and FIG. 4b are schematic side views and top views, respectively, as indicated by the coordinate systems. The coordinate systems are consistent throughout the different figures of the disclosure. FIG. 4a depicts ten light sources 430 at the outer peripheral of each lens 230. These ten light sources 430 (reference numbers only given on the left lens for not overloading the picture) can, for example, be the ten LEDs 110-119 described in relation to FIG. 1c. The ten light sources 430 can constitute the second light source 270. It should, however, be emphasised that any other number of light sources can make up the second light source 270.

FIG. 5a depicts an example of a transmission calibration image. The transmission calibration image corresponds to an image taken by the camera 240 when first light is transmitted through the calibration target 210 and the lens 230 to the camera 240. In the shown example, the transmission calibration image originates from a calibration target 210 similar to the one depicted in FIG. 3. The size of the cross and the number of small openings slightly differs.

FIG. 5b depicts an example of a reflection calibration image. The reflection calibration image corresponds to an image taken by the camera 240 when light from the second light source 270 is reflected on the calibration target and then passes through the lens 230 to the camera 240. The reflection calibration image shows a number of blobs 297, of which only one is shown with reference number. In FIG. 5b ten blobs 297 with comparably large intensities can be seen. Further, a number of blobs with comparably smaller intensities can be seen. Similar patterns are especially pronounced in case the lens 230 is a Fresnel lens. A blob typically extends largely in one direction and only to a small amount in a perpendicular direction. The direction in which the blobs extend largely will in the following be denoted longitudinal axis of the blob. It should be noted that the longitudinal axes of different blobs generally are not in parallel. A part of the approximate longitudinal axis of blob 297 is depicted by a black line 296. The longitudinal axes of a blob, even denoted longitudinal extension, does extend even outside the blob. As can be seen from FIG. 5b, the longitudinal axes of different blobs do approximately coincide at some point of the figure.

Figure 6:
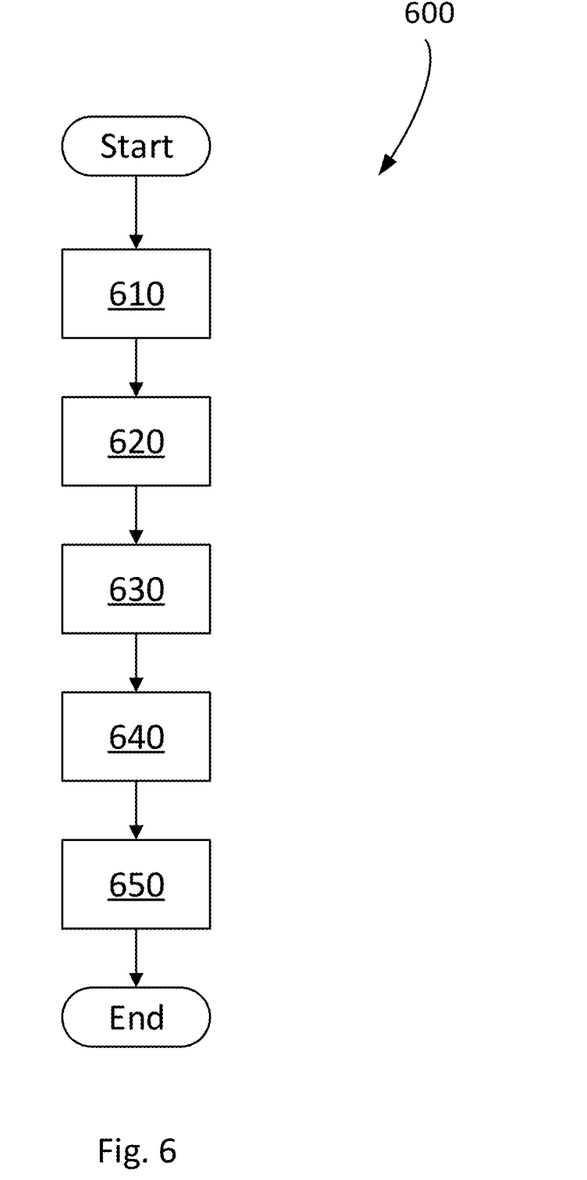
FIG. 6 depicts a flowchart of a method according to the present disclosure.

FIG. 6 depicts a flowchart of an example of a method 600 according to the present disclosure. The method 600 is a method for calibrating a camera of a HMD. The HMD can be any of the HMD 201 or the VR HMD 100 described earlier.

The method 600 starts with step 610. Step 610 comprises providing a calibration target in front of a lens of the HMD. The calibration target can be any of the calibration targets described earlier, for example in relation to FIG. 2a or FIG. 3. The calibration target and the lens each basically extend in a two-dimensional plane. The lens might be a Fresnel lens. Step 610 can comprise mounting the calibration target in a calibration mount. The calibration mount can be a calibration mount in which the calibration target is fixated. The calibration mount can be a calibration mount which allows the calibration target to move in one direction, for example the direction perpendicular to the two-dimensional plane in which the calibration target basically extends. This facilitates moving the calibration target to different calibration distances 290 as described in relation to FIG. 2b. Step 610 can comprise fixating the calibration mount in relation to the HMD. The method continues with step 620.

Step 620 comprises determining a lateral position of the calibration target. The lateral position relates to a position of the calibration target in the two-dimensional plane in which the calibration target basically extends. Step 620 can comprise determining the lateral position of a central point of the calibration target. An example of a central point is the cross of the calibration target as described in relation to FIG. 3. However, the central point can have any arbitrary form. It is also not a prerequisite that the point whose lateral position is determined is situated at the centre of the calibration target. In principle, the lateral position of an arbitrary point at the calibration target can be determined. However, it is in this case advantageous to know the relative position of the determined point on the calibration target.

Step 620 can comprise illuminating the calibration target with first light from a first light source. The illumination is performed from a side of the calibration target which is opposite the side of the lens. The illumination is performed in such a way that the first light from the first light source is transmitted through the calibration target to the lens. Step 620 can comprise detecting the first light with a camera arranged on a side of the lens which is opposite the calibration target. As an example, the camera might take a picture of the first light. An example of such a picture is given in FIG. 5a. From the detected light, the lateral position of the calibration target might be determined. As an example, from a picture of the camera, the lateral position of the calibration target might be determined. As an example, a displacement of the calibration target in the two-dimensional plane in which it largely extends would move the cross in FIG. 5a in a corresponding direction. Thus, from detecting the position of the cross in FIG. 5a, the lateral position of the calibration target can be determined. The method continues with step 630.

Step 630 comprises determining a lateral position of the lens. The lateral position of the lens relates to a position of the lens in the two-dimensional plane in which it largely extends. Step 630 can comprise determining the lateral position of a lens centre. However, it is not a prerequisite that the lateral position of the lens centre is determined. In principle, any position of the lens in the two-dimensional plane of its extension can be determined. It is advantageous, if the relation between the determined point and the lens is known. However, since the calibration is usually performed in relation to manufacturing and the lens which has been assembled is typically known, the relation between the determined point and the lens will typically also be known.

Step 630 can comprise determining the lateral position of the lens at several calibration distances between the lens and the calibration target. The calibration distance is the distance between the lens and the calibration target perpendicular to the lateral extensions of the lens and the calibration target. This can advantageously be implemented in case the calibration target is mounted on a calibration mount. The lateral position of the lens can determined based on the determined lateral positions of the lens at several calibration distances between the lens and the calibration target. As an example, the lateral position of the lens can be determined as the statistical average, or a weighted statistical average of the determined lateral positions of the lens at several calibration distances between the lens and the calibration target. The weighting can be based on the specific calibration distance. Basing the determining of the lateral position of the lens on the determining of the lateral position of the lens at several calibration distances can increase accuracy of the result and/or confidence in the result. However, in principle it is enough to determine the lateral position of the lens at only one calibration distance.

Step 630 can comprise illuminating the calibration target with second light from a second light source. The second light source is preferably arranged between the lens and the calibration target. Step 630 can comprise detecting reflections of the second light with a camera arranged on a side of the lens which is opposite the calibration target. As an example, the camera can detect an image of the reflection. An example of an image of the detected reflections is shown in FIG. 5b. From the detected reflection, for example from an image of the detected reflections, the lateral position of the lens can be determined.

Step 630 can comprise determining blobs in the reflections of the second light. An example of the blobs can be seen in FIG. 5b. The determining of the blobs can be performed via image analysis, such as computer vision. Step 630 can comprise determining the longitudinal extension of the blobs. This can be performed via image analysis as well.

In one example, this is performed via a floodfill algorithm. In one example, a line is fitted to the longitudinal extension of a blob. A lens centre might be determined based on intersection(s) between longitudinal extension lines of the determined blobs. This might be performed via image analysis as well. It should be emphasised that the longitudinal extensions do not necessarily intersect altogether at one point. In principle, the different intersections might deviate to some extent. As an example, the central point of the intersections can be determined as the lens centre. However, other ways are possible as well for determining the lens centre based on the intersections. As an example, an optimisation algorithm can be used for the fitted lines. The blobs are especially announce at Fresnel lenses. However, the blobs can also appear for other lens designs. Further, other lens designs might offer other ways of determining the lateral position of the lens.

It should, however, be emphasised that the steps 620 and 630 are independent from each other. One determines the lateral position of the calibration target and one determines the lateral position of the lens. It is thus neither assumed that the lens sits perfectly aligned in the HMD, nor that the calibration target is situated at a specific position. Being not dependent on any of these two assumptions increases the accuracy and the flexibility of the method. The method continues with step 640.

Step 640 comprises determining a calibration target misalignment based on the determined lateral position of the calibration target and based on the determined lateral position of the lens. The calibration target misalignment can be a one-dimensional quantity, for example a distance to the originally intended position of the calibration target. However, in general the calibration target misalignment is a two-, or three-dimensional vector. This vector can, for example, describe the displacement from the intended original position of the calibration target. The method continues with step 650.

Step 650 comprises performing a hardware calibration of the camera of the HMD. The hardware calibration is adapted for the calibration target misalignment. The hardware calibration can comprise calibrating the intrinsic and/or extrinsic parameters of the camera. The hardware calibration can comprise calibrating for lens distortion. These parameters might then be stored in a memory, such as a memory of the HMD. When operating the HMD, the software operating the HMD can then adapt for extrinsic and/or intrinsic parameters of the camera. The software can further adapt for the lateral position of the lens determined in step 630. As an example, the term adapt can comprise compensating images taken by a camera for the calibration target misalignment and/or lateral position of the lens. After step 650, the method 600 ends.

The method 600 can be performed for one or for several lenses of a HMD, such as for a lens intended for the left eye of a user and a lens intended for the right eye of a user. The method 600 can be performed with the help of any of the elements described in relation to FIG. 1-5*b*. Further, the method 600 can comprise any of the properties or features attributed to any of these elements. Conversely, the arrangement 200 or elements thereof might comprise features described in relation to FIG. 6 and/or be arranged to perform any of the method steps described in relation to FIG. 6.

According to an aspect of the disclosure, a computer program product can be provided. The computer program product can comprise instructions which, when executed by a computer, cause the computer to carry out some or all of the steps described in relation to method 600.

The computer program product might, for example, be executed, fully or in part, by the calibration processor 250 described in relation to FIG. 2*a*.

The invention claimed is:

1. A method for calibrating a camera of a head-mounted display, HMD, the method comprising the steps of:
providing a calibration target in front of a lens of the HMD, wherein each of the calibration target and the lens each basically extend in a corresponding two-dimensional plane;
determining a lateral position of the calibration target, wherein the lateral position relates to a position of the calibration target in the two-dimensional plane;
determining a lateral position of the lens, wherein the lateral position relates to a position of the lens in the two-dimensional plane;
determining a calibration target misalignment based on the determined lateral position of the calibration target and based on the determined lateral position of the lens; and
performing a hardware calibration of the camera of the HMD, wherein the hardware calibration is adapted for the calibration target misalignment.

2. The method according to claim 1, wherein the step of determining the lateral position of the calibration target comprises determining the lateral position of a central point of the calibration target.

3. The method according to claim 1, wherein the step of determining the lateral position of the calibration target comprises illuminating the calibration target with first light from a first light source from a side of the calibration target which is opposite the side of the lens so that the first light from the first light source is transmitted through the calibration target to the lens.

4. The method according to claim 3, wherein the step of determining the lateral position of the calibration target further comprises detecting the first light with the camera arranged on a side of the lens which is opposite the calibration target.

5. The method according to claim 1, wherein the step of determining the lateral position of the lens comprises determining the lateral position of a lens centre.

6. The method according to claim 1, wherein the step of determining the lateral position of the lens comprises determining the lateral position of the lens at several calibration distances between the lens and the calibration target, wherein the calibration distance is the distance between the lens and the calibration target perpendicular to the lateral extensions of the lens and the calibration target, and wherein the lateral position of the lens is determined based on the determined lateral positions of the lens at several calibration distances between the lens and the calibration target.

7. The method according to claim 1, wherein the step of determining the lateral position of the lens comprises illuminating the calibration target with second light from a second light source, wherein the second light source is arranged between the lens and the calibration target.

8. The method according to claim 7, wherein the step of determining the lateral position of the lens further comprises detecting reflections of the second light with the camera arranged on a side of the lens which is opposite the calibration target.

9. The method according to claim 8, wherein the step of determining the lateral position of the lens further comprises determining blobs in the reflections of the second light.

10. The method according to claim 9, wherein the step of determining the lateral position of the lens further comprises determining a lens centre based on intersection(s) between longitudinal extension lines of the determined blobs.

11. The method according to claim 1, wherein the step of providing a calibration target in front of a lens of the HMD comprises mounting the calibration target in a calibration mount and fixating the calibration mount in relation to the HMD.

12. An arrangement for calibrating a camera of a head-mounted display, HMD, the arrangement comprising:
the HMD, comprising the camera and comprising at least one lens, wherein the lens basically extends in a two-dimensional plane;
a calibration target, being arranged in front of the lens, wherein the calibration target basically extends in a two-dimensional plane;
a calibration processor, being arranged to
  i. determine the lateral position of the calibration target, wherein the lateral position of the calibration target relates to a position of the calibration target in the two-dimensional plane;
  ii. determine the lateral position of the lens, wherein the lateral position of the lens relates to a position of the lens in the two-dimensional plane;
  iii. determine the calibration target misalignment based on the determined lateral position of the calibration target and based on the determined lateral position of the lens; and
  iv. performing a hardware calibration of the camera of the HMD, wherein the hardware calibration is adapted for the calibration target misalignment.

13. The arrangement according to claim 12, further comprising a calibration mount, wherein the calibration mount comprises the calibration target, and wherein the calibration mount is fixed in relation to the HMD.

14. The arrangement according to claim 12, wherein the HMD is a virtual reality, VR, HMD.

15. The arrangement according to claim 12, further comprising a first light source being arranged to illuminate the calibration target with first light from a side of the calibration target which is opposite the side of the lens so that the first light from the first light source is transmitted through the calibration target to the lens.

16. The arrangement according to claim 12, further comprising a second light source being arranged to illuminate the calibration target with second light, wherein the second light source is arranged between the lens and the calibration target.

17. The arrangement according to claim 15, wherein the first light source and/or the second light source comprises at least one light emitting diode.

18. The arrangement according to claim 12, wherein the camera is arranged on the side of the lens which is opposite the calibration target.

19. The arrangement according to claim 12, wherein the lens is a Fresnel lens.

20. A non-transitory computer-readable storage medium storing instructions which, when executed by a computer, cause the computer to carry out the steps of:
determining the lateral position of a calibration target in front of a lens of the HMD, wherein each of the calibration target and the lens basically extend in a corresponding two-dimensional plane, and wherein the lateral position of the calibration target relates to a position of the calibration target in the two-dimensional plane;
determining the lateral position of the lens, wherein the lateral position of the lens relates to a position of the calibration target in the two-dimensional plane;
determining the calibration target misalignment based on the determined lateral position of the calibration target and based on the determined lateral position of the lens; and
performing a hardware calibration of the camera of the HMD, wherein the hardware calibration is adapted for the calibration target misalignment.

* * * * *